Patented Jan. 23, 1923.

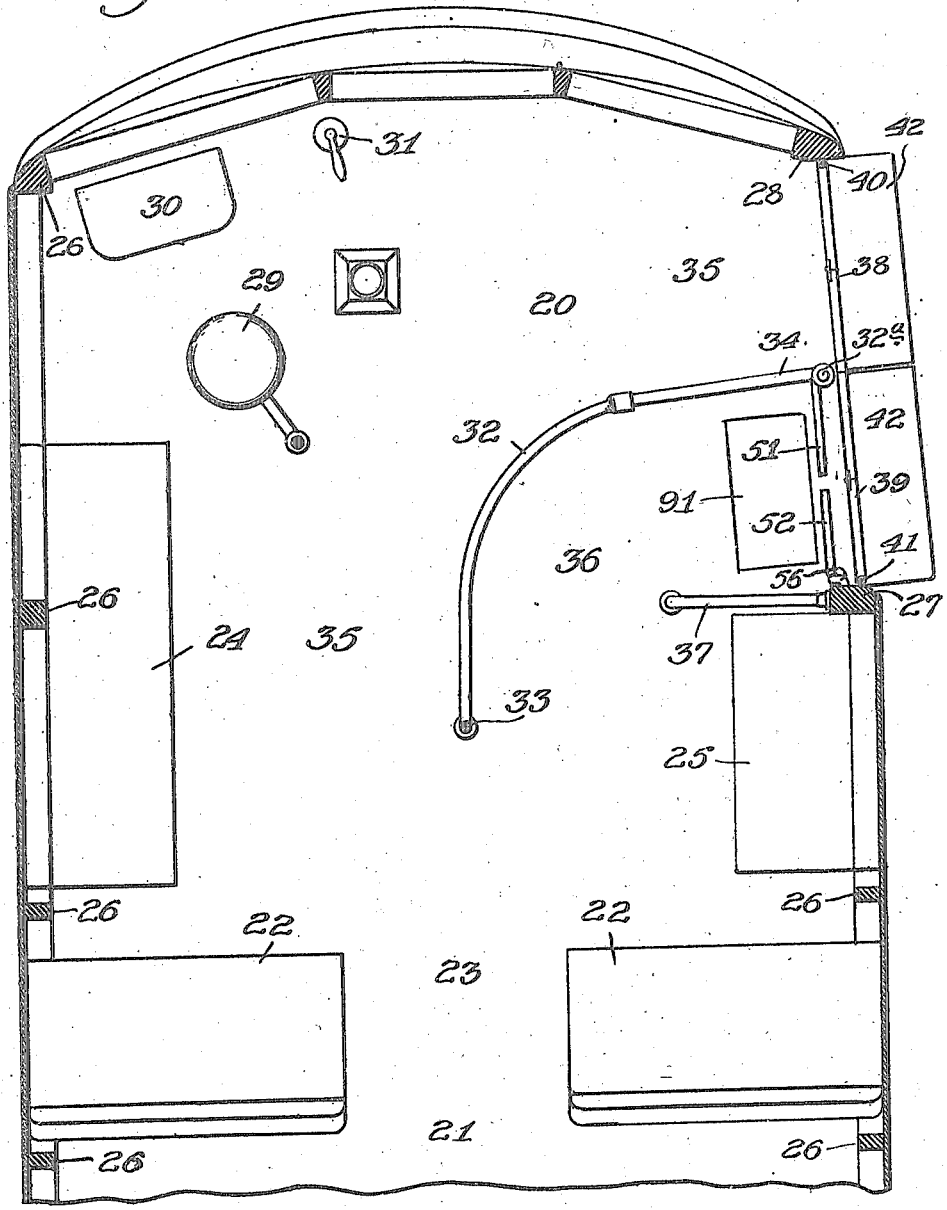

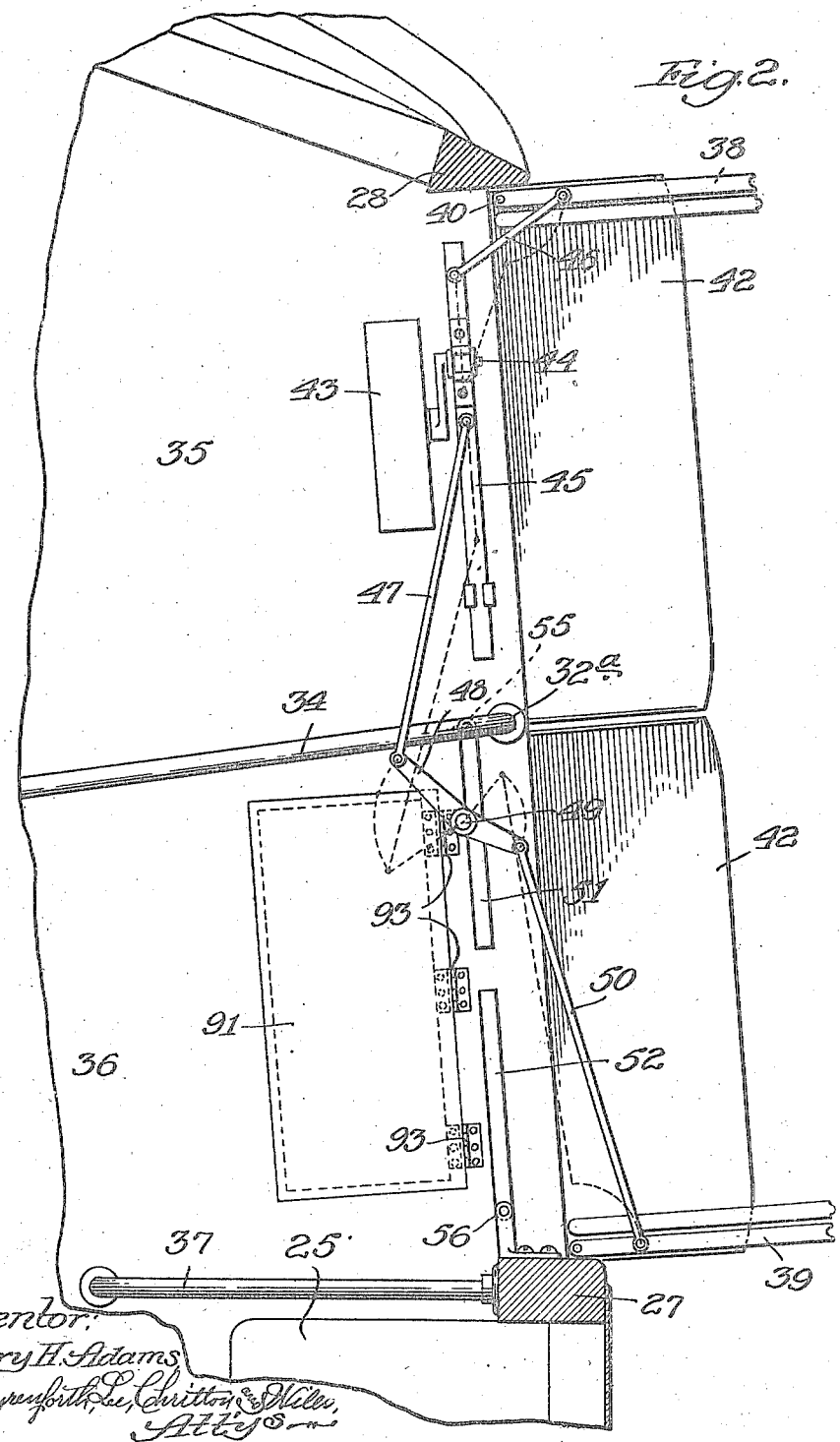

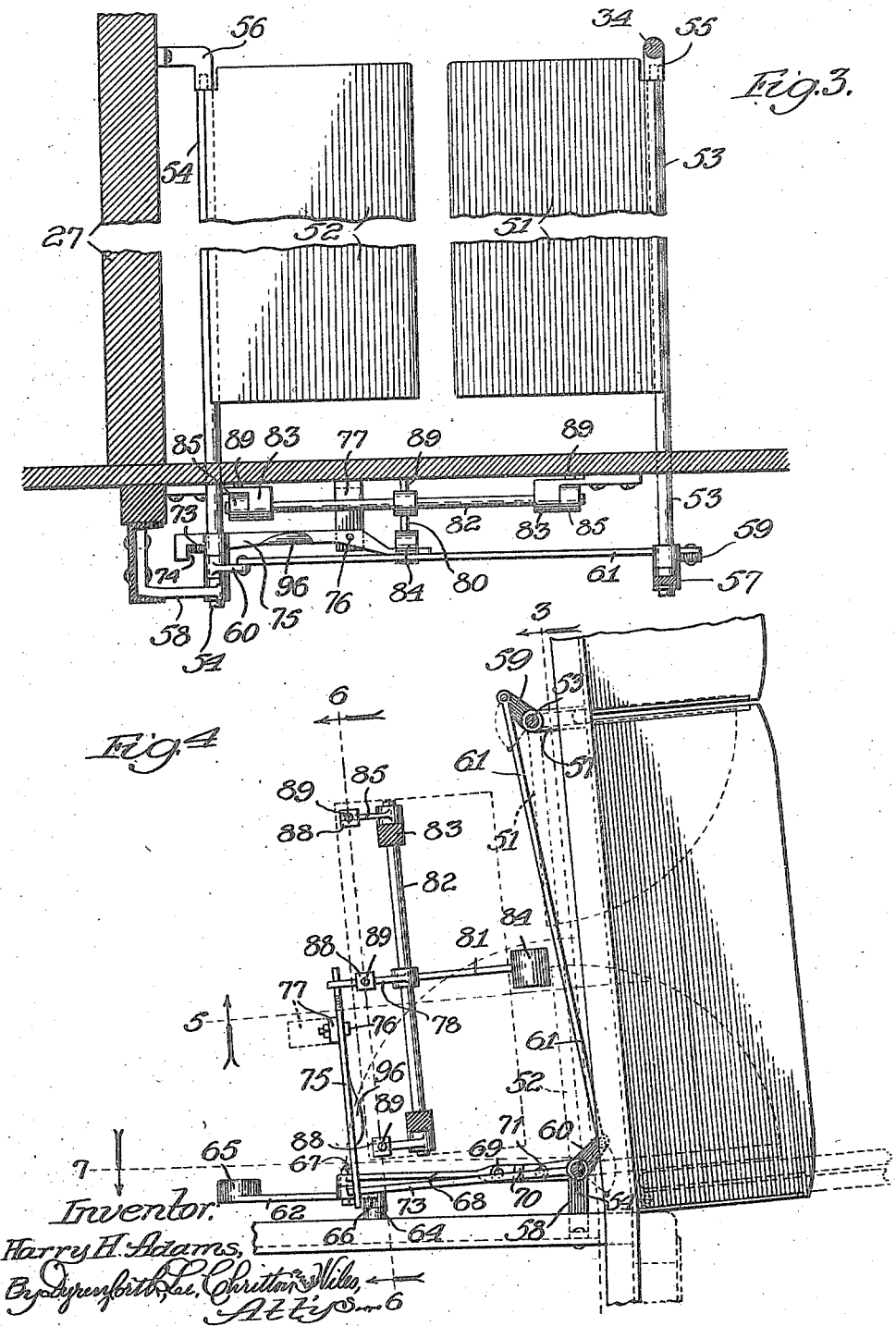

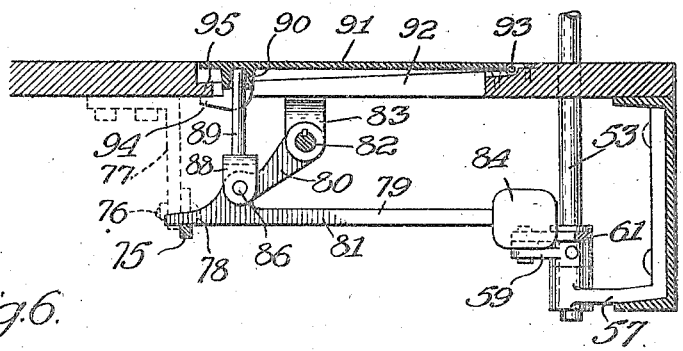
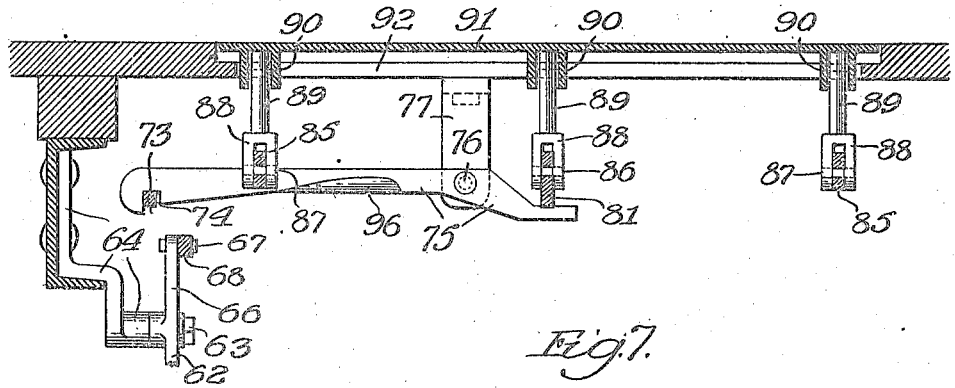
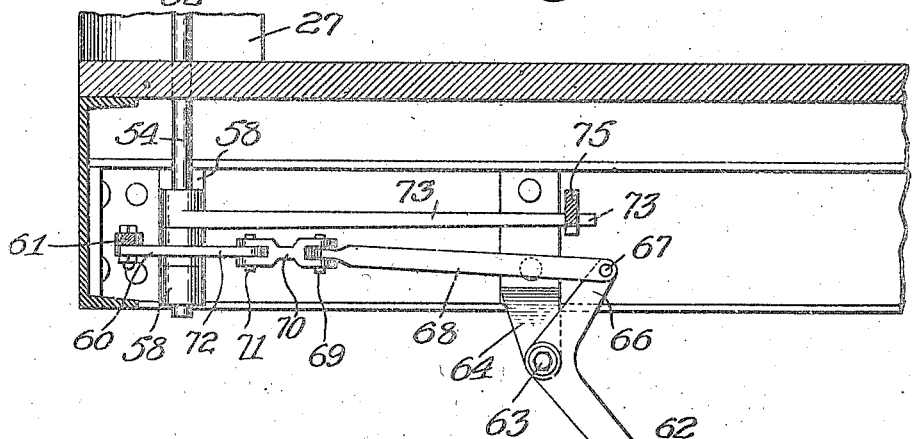

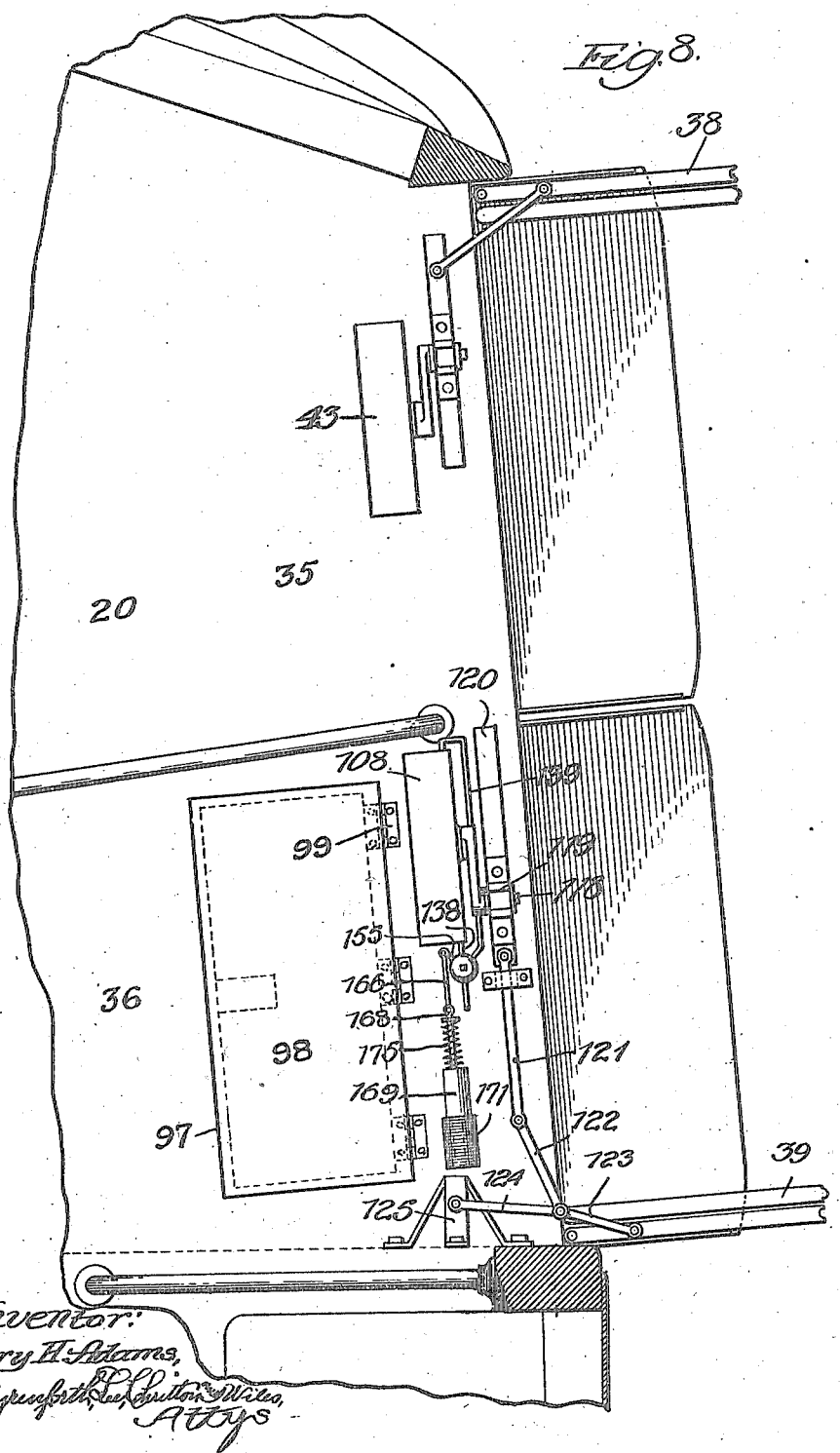

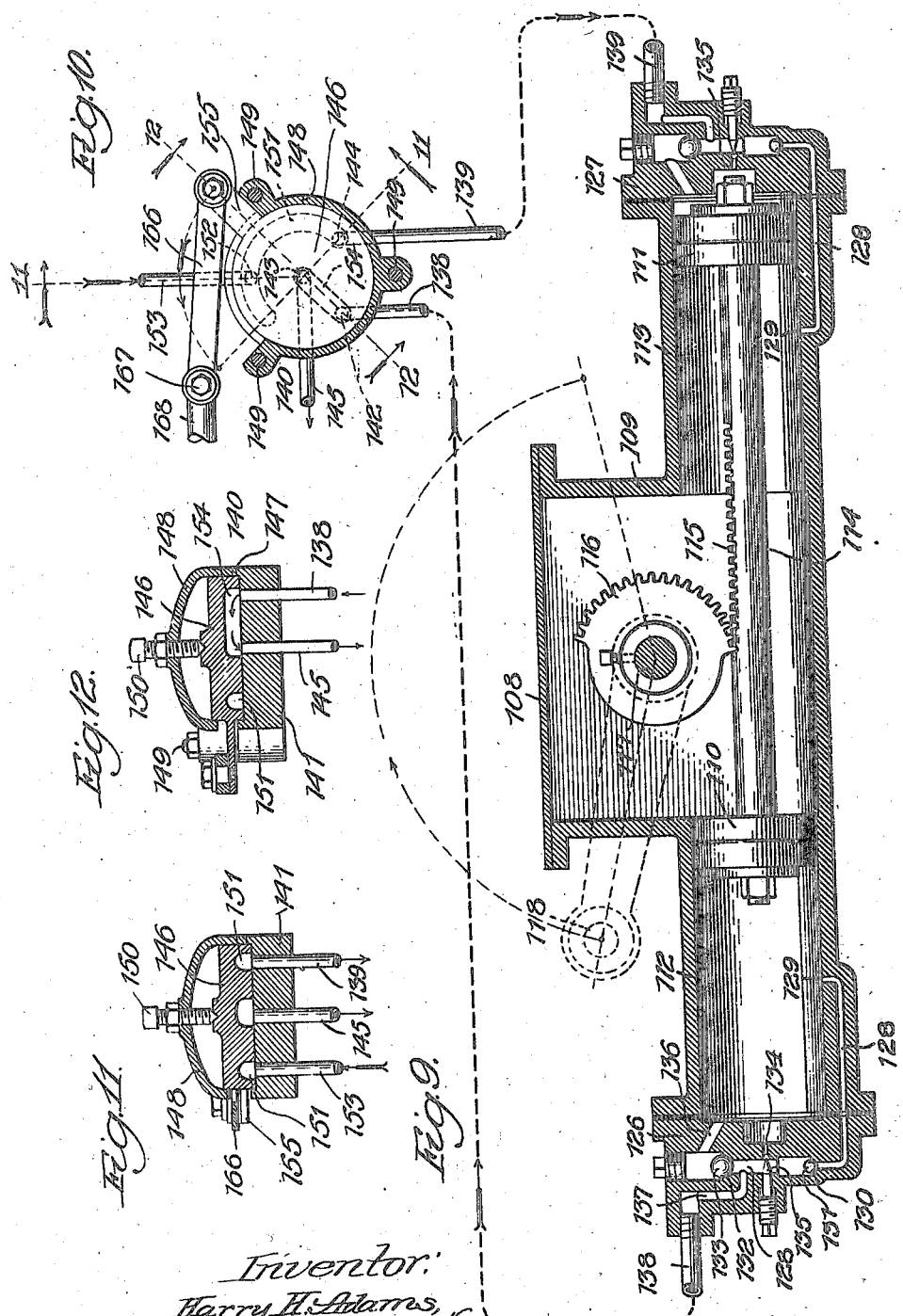

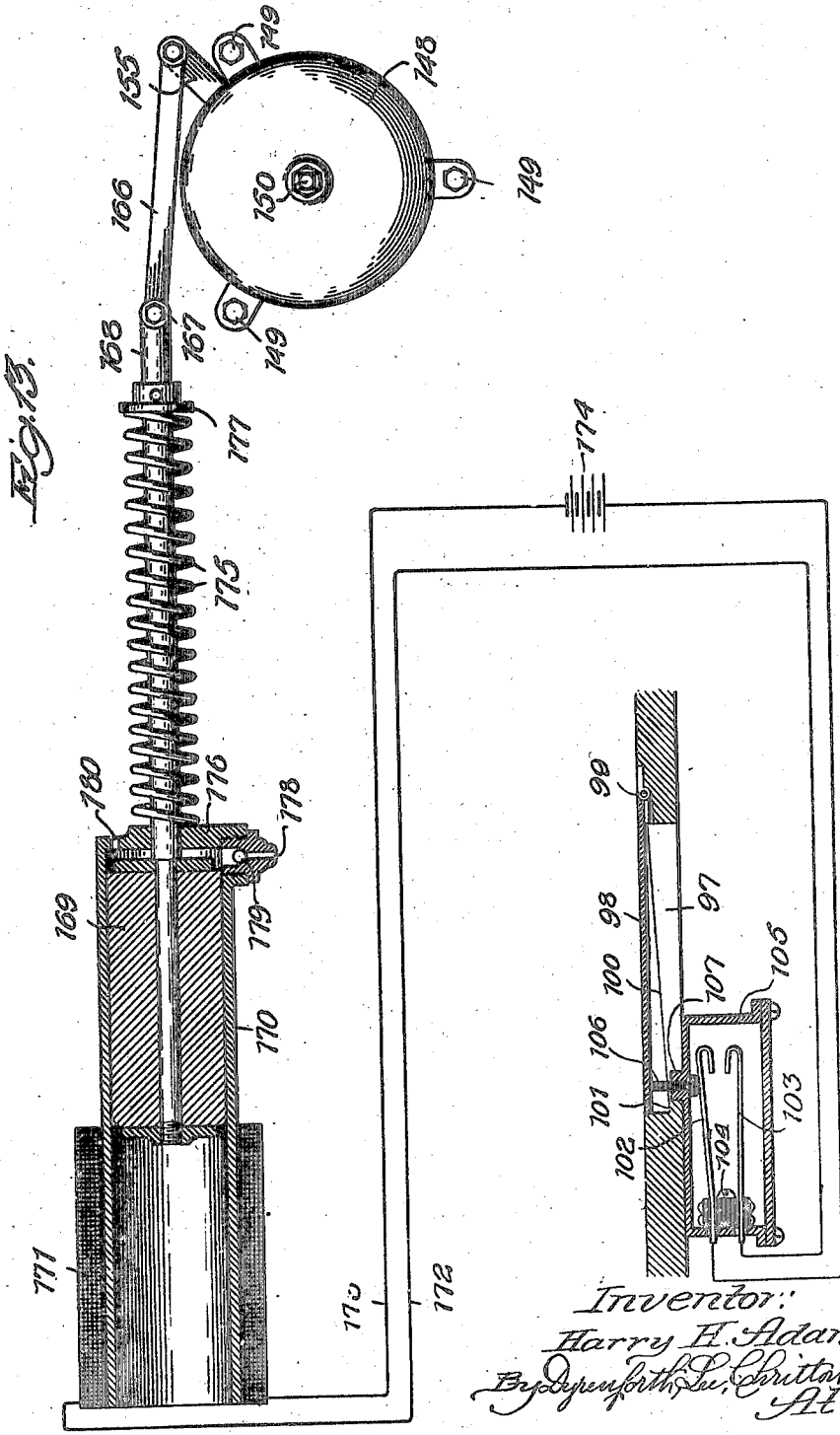

1,443,200

UNITED STATES PATENT OFFICE.

HARRY H. ADAMS, OF CHICAGO, ILLINOIS.

VEHICLE.

Application filed December 20, 1920. Serial No. 431,974.

*To all whom it may concern:*

Be it known that I, HARRY H. ADAMS, a citizen of the United States, residing at Chicago, in the county of Cook and State of Illinois, have invented a new and useful Improvement in Vehicles, of which the following is a specification.

My invention relates more particularly to passenger-carrying vehicles such, for example, as street cars, busses, and the like, and more especially to vehicles of the character stated employing one person only in their operation, such kind of vehicles being commonly known as "one man control" vehicles.

My object, generally stated, is to provide a vehicle of the character stated which may be controlled by one operator and which shall present means presenting a barrier to the boarding of the car by passengers through the exit passageway on the platform, but which will not present obstruction to the alighting from the car of passengers from the exit-way, these means being preferably controlled automatically by the movement of the passenger through the exit-way in alighting from the car, the purpose being to render unnecessary any attention, on the part of the operator, to the attempts of persons to board the car through the exit passageway, and preventing the boarding of the car by persons through the passageway without requiring any attention on the part of the operator for preventing such unauthorized boarding of the car.

In cars of this character, the fares are collected, usually, at a point adjacent the location of the operator who is positioned at the motor-controller, and it is his duty to see that fares are collected from the passengers boarding the car through the entrance-way on the platform, and it is one of my objects to permit the operator to center his attention on the collection of the fares without requiring him to give any attention to the attempts of persons to gain unauthorized access to the car by boarding it through the exit-way, especially while he is engaged in collecting fares.

Referring to the accompanying drawings:

Figure 1 is a plan sectional view of the platform-equipped front end of a vehicle, shown as a street car, having entrance and exit way, and constituting one embodiment of my invention. Figure 2 is a broken sectional view at one side of the platform, the section being taken between the upper edges of the doors at the outer ends of the entrance and exit ways, and the upper horizontal member of the door casing, this view showing somewhat diagrammatically the operating mechanism for the doors. Figure 3 is a broken vertical sectional view taken through a portion of the structure shown in Fig. 1, the section being taken at the line 3 on Fig. 4 and viewed in the direction of the arrow. Figure 4 is a plan sectional view substantially in the plane of the under side of the platform, of a portion of the structure shown in Fig. 2. Figure 5 is a broken section taken at the line 5 on Fig. 4 and viewed in the direction of the arrow. Figure 6 is a section taken at the line 6—6 on Fig. 4 and viewed in the direction of the arrows. Figure 7 is a section taken at the line 7 on Fig. 4 and viewed in the direction of the arrow. Figure 8 is a view like Fig. 2 of another embodiment of my invention. Figure 9 is a sectional view in elevation of the air-motor through the medium of which the exit-way barrier means are operated. Figure 10 is a sectional view of the valve device, and a portion of the operating means therefor, for controlling the motor shown in Fig. 9, the connections between the valve device and motor being shown by dotted lines. Figure 11 is a section taken at the broken line 11—11 on Fig. 10 and viewed in the direction of the arrows. Figure 12 is a section taken at the line 12—12 on Fig. 10 and viewed in the direction of the arrows; and Figure 13, a view, partly in section, of the mechanism for electrically operating the valve device of Fig. 10, and showing the circuit connections therefor.

I have chosen to illustrate my invention, but without any intention thereby to limit it as to its broader features, in connection with a vehicle wherein the barrier means at the exit-way for accomplishing the purposes hereinbefore stated, are normally locked in closed, obstructing, condition, and are automatically released for movement to open position by the passenger walking through the exit-way in alighting from the car, these barrier means moving to open position by the passenger pushing against them, the car being also provided with the usual platform doors at the ends of the entrance and exit ways, controlled by the operator of the car, this embodiment of my invention being illustrated in Figs. 1 to 7 inclusive of the drawings; and also in connection with a vehicle, likewise provided with the platform doors referred to, the door at the outer end of the entrance-way being controlled by the operator of the car, and the door at the outer end of the exit-way and forming the barrier means hereinbefore referred to for obstructing the boarding of the car by persons through the exit-way, being normally held in closed, obstructing, condition but automatically movable to open condition by the mere act of the passenger walking through the exit-way, this embodiment of my invention being illustrated in Figs. 8 to 13 inclusive.

Referring to the construction shown in Figs. 1 to 7 inclusive, the front platform of the car is represented at 20, it being shown as a continuation of, and on the same level with, the floor 21 of the body portion of the car, the front cross seats of which are represented at 22 affording the aisle 23 therebetween. The car is shown as provided with a lengthwise-extending seat 24 at the closed side of the platform 20 and with a similar, but shorter, seat 25 at the other side of the platform. The various stanchions at this end of the car, for supporting the adjacent side walls and roof, are represented at 26, 27 and 28, the stanchion 27 extending in front of the seat 25, the side of the car between the stanchions 27 and 28 presenting an opening which may be, and as shown is, provided with folding doors hereinafter referred to. The operator's seat is represented at 29 and is so located as to render readily operable the motor-controlling mechanism represented at 30 and mechanism represented at 31 for controlling the platform doors just referred to, which mechanisms may be such as are commonly provided. The platform 20 is provided with a rail 32 rising therefrom and preferably of the general curved form shown, this rail terminating at its depending end portion 33 preferably at a point on the platform substantially midway between the sides of the latter and in advance of the cross seats 22, the rail thence extending toward the front end of the car and curving laterally toward the opening between the stanchions 27 and 28 adjacent to which its outer extremity 34 extends substantially midway between these stanchions, at which point it is connected with a post 32ª rising from the platform 20 and preferably connected at its upper end (not shown) with the upper structure of the car, thereby defining on the platform 20 an entrance-way represented at 35 which extends adjacent the position of the operator at 29, and an exit-way represented at 36, both of these ways opening at one end into the interior of the car and at their other ends through the space between the stanchions 27 and 28, there being preferably provided to extend part way in the exit-way 36, a rail 37 secured at one end to the stanchion 27 at a point above the floor and at its opposite, inner, depending, end to the platform.

The opening between the stanchions 27 and 28 is shown as provided with folding doors hereinbefore referred to and represented at 38 and 39, these doors meeting adjacent the post 32ª and each being preferably formed of sections hinged together as shown, these doors being hingedly connected at 40 and 41 to the stanchions 28 and 27, respectively, and guided at their outer sections as by guides at the top of the said opening, all in accordance with common practice, the platform 20 also being provided with steps 42 hingedly connected therewith as is usual in street car structures. The doors 38 and 39 are shown as controlled by the operator located at the seat 29, by manipulation of the controller device 31 which, in a manner not shown but which in common practice, serves to control the operation of a door-operating motor represented at 43 and located above the doors, this motor operating a crank portion 44 which in operating reciprocates a slide-member 45 having link connection 46 with the door 38 and operative connection with the other door 39, for simultaneously operating it, through the medium of a link 47 pivoted to one end of a rock lever 48 fulcrumed at 49 to the platform and pivotally connected at its opposite end with a link 50 pivoted to the door 39. Connections also may be provided between the operating mechanism stated and the movable step 42 for causing the step to be swung to horizontal position upon the opening of the doors and swung to vertical position upon the closing of the doors. The mechanism for controlling the doors and step being such as in common use, a further description is therefore unnecessary.

The exit-way 36, in the construction shown, is provided with barrier means hereinbefore referred to, located at the inside of the door 39 and shown as formed of two sections 51 and 52 in the form of leaves which are, respectively, connected at their edges with upwardly-extending rotatable shafts 53 and 54 journaled at their upper ends in bearings 55 and 56 extending, respectively, from the rail 32 and the stanchion 27, their lower ends being journaled in brackets 57 and 58 connected with the frame of the car. The shafts 53 and 54 are connected together for simultaneous movement in opposite directions, namely, to swing the gate section 51 on its pivot 53 in counter-clockwise direction in Fig. 1 and the gate section 52 in clockwise direction in this figure, through the medium of crank arms 59 and 60 secured to the shafts 53 and 54 and connected together by a link 61 pivoted thereto at its ends.

The gate sections 51 and 52 cooperate with means which operate to swing the gate sections to closed, obstructing position shown in Figs. 1 and 3, this mechanism comprising a lever 62 fulcrumed between its ends at 63 on a bracket 64 depending from the under-frame of the car and having its longer, lower, end weighted as indicated at 65, the opposite end 66 of this lever, which is shown as of bell-crank form, being pivotally connected, as indicated at 67, with a link 68 which in turn is pivotally connected at 69 with a link 70, the latter being pivotally connected at 71 with a crank arm 72 secured to the shaft 54, the arrangement of the parts described being such that when the gate sections 51 and 52 are swung outwardly, by a passenger, in leaving the car, pushing against the gate, the gate sections will be automatically returned to closed, obstructing, position across the exit-way 36.

The gate mechanism referred to also cooperates with mechanism operating to releasably lock the gate sections against movement, these means, in the particular embodiment of my invention, which is now being described, comprising an arm 73 rigidly secured to, and extending laterally from, the shaft 54 for cooperation with the notched portion 74 of a lever 75 fulcrumed between its ends, at 76, on a bracket 77 depending from the car platform, the other end of this lever extending beneath the end portion 78 of an angle-shaped lever 79 the arms of which are represented at 80 and 81, this lever being connected at the upper end of its arm 80 with a shaft 82 journaled at its ends in brackets 83 secured to the under side of the platform, the extremity of the arm 81 of this lever being weighted as indicated at 84, and the tendency of this weight being to rock the shaft 82 in clockwise direction in Fig. 5. The shaft 82 is equipped at its opposite ends with arms 85 which extend into the same position as the portions 80 of the lever 79. Pivotally connected with the arm 80 at the left hand side of its pivot 82 in Fig. 5, and with extremities of the arms 85, as indicated at 86 and 87, are yoke-shaped clips 88 provided with upwardly-extending stem portions 89 which extend into downwardly-opening sockets 90 provided on the underside of a plate-like treadle 91, intermediate the ends of the latter, this treadle being located within an opening 92 in the car platform 20 and in such position as to be stepped upon when a passenger walks through the exit-way 36 toward its outer end, this treadle being shown as hinged at the edge thereof adjacent the open side of the platform, as represented at 93. The treadle 91 is prevented from rising to a position in which it extends above the level of the platform 20 by the provision of a stop lug 94 depending from the under side thereof and extending into overlapping relation relative to a portion 95 of the car platform, the parts, as shown, being so proportioned and arranged that the treadle 91 may have a limited swinging movement in both directions sufficient to actuate the mechanism controlled thereby as hereinafter described. The provision of the several push rods 87 at the ends and toward the center of the treadle serves to insure the proper operation of the shaft 82 whether the passenger steps upon the treadle at either edge thereof or between its edges. The lever 75 which is so pivoted, as shown at 76, as to tend to rock downwardly at its left hand end in Fig. 6, is formed with a cam surface 96 between its ends, for a purpose hereinafter described.

The operation of the gate-controlling mechanism is as follows: The treading upon the plate-treadle 91 by a passenger in walking through the exit-way 36 before alighting from the car, causes the shaft 82 to rotate in counter-clockwise direction against the action of the weight 84, with the result of rocking the lever 79 in the same direction and causing the portion 78 thereof to bear down on the adjacent end of the lever 75. This results in rocking the lever 75 to a position in which its opposite end disengages, at its notch 74 from the arm 73, thereby causing the sections of the gate to become unlocked and permitting the passenger, by pushing against the gates, to continue through the gate-way and alight from the car (the operator of the car having opened the doors 38 and 39), the gate swinging outwardly against the resistance of the weighted lever 62. When the passenger has passed beyond the gate, or the last passenger of a number thereof leaving the car, where the passengers follow closely after each other, has passed the gate, the gate sections automatically return to the obstructing position shown in Fig. 1, under the action of the weighted lever 62 which swings downwardly to normal position, the arm 73 in this movement swinging into interlocked engagement with the notched portion 74 of the lever 75 to releasably lock the gate against actuation until again released by a passenger stepping upon the treadle 91. The cam surface 96 is provided to insure against the jamming of the end surface of the arm 73 against the side of the lever 75 in the return movement referred to, the engagement of the arm 73 with the cam surface 96 serving to lift the lever 75 and permit the arm 73 to ride against the under side of the lever 75 into interlocked relation with the notch 74.

Referring to the construction shown in Figs. 8 to 13 inclusive, the barrier means for the exit-way 36 and door 39 formed of sections and supported, as hereinbefore described, and the operator of the car controls the opening and closing of the door 38 only, this being effected through the motor 43 from a controlling device such as that referred to by the numeral 31 in Fig. 1. In this particular arrangement the door 39 is automatically opened by the passenger walking across the floor of the exit-way 36, and automatically returns to closed condition.

In this construction the platform 20 over which the passengers walk in leaving the car, is recessed, as indicated at 97, in which recess a treadle-plate 98 is located, this plate being hingedly supported to the platform, as indicated at 99. The sides of the recessed portion 97 are so formed as to present ledges 100 and 101 serving as stops for limiting the downward movement of the treadle 98. Located below the platform 20 is a switch device shown as formed of a pair of contact members 102 and 103 supported in a block 104 of insulating material secured to the interior of a casing 105 fastened to the under side of the platform, and housing switch contacts 102 and 103, these contacts being normally spaced apart as shown. A plunger 106 of insulating material is reciprocable vertically in an opening 107 in the top of the casing 105 and serves as a means by which, when the treadle 98 is swung downwardly by a passenger stepping upon it, the contacts 102 and 103 are forced into engagement with each other. The door 39 in this construction is operated by a gate-opening-and-closing motor 108, separate from the motor 43 and preferably located near the roof of the car, this motor, which is of the same internal construction as those hereinbefore referred to, comprising a casing 109 containing pistons 110 and 111 operating in cylindrical portions 112 and 113 of the casing, these pistons being connected by a rod 114 presenting gear-teeth 115 along its upper edge with which mesh the teeth of a segmental rack 116 secured to a shaft 117 provided with a crank arm 118 through the medium of which the door 39 is operated to open and close it by the engagement of the crank 118 with the walls of a slot 119 rising from a bar 120 supported to be lengthwise reciprocable and pivotally connected at one end with door-operating lever mechanism formed of the levers 122, 123 and 124 pivotally connected with the door 39 and a bracket 125 on a stationary part of the car, this lever mechanism operating to move the sectional door 39 into open position upon moving the bar 120 in one direction and into closed position upon operating this bar in the opposite direction, the lever mechanism just referred to being of such construction and arrangement, and operating, as in the case of mechanisms commonly provided for operating street car doors.

The motor 108 also comprises, in accordance with common practice, the heads 126 and 127 closing the ends of the cylindrical portions 112 and 113, respectively, each of these heads being provided with a passage 128 continued into the wall of the adjacent cylindrical portion of the casing, and opening into the interior of the cylinders at 129, these passageways having seats 130 controlled by ball-checks 131 which close toward the cylinders with which they, respectively, cooperate. The passages 128 also contain seats 132 controlled by ball-checks 133 which close in the same direction as the ball-checks 131. Passages 134 in the heads open into the cylindrical portions 112 and 113 and into the adjacent passages 128, between the ball checks 131 and 133, and are controlled by needle valves 135. Relatively larger pasageways 136 open into the cylinders 112 and 113, respectively, and into the passages 128 beyond both valves 131 and 133. A passageway 137 opens into each of the passageways 128 between the ball-checks 131 and 133, the passages 137 communicating, respectively, with pipes 138 and 139 which lead to a valve mechanism 140 shown as formed of a stationary disk-like member 141 containing ports 142, 143 and 144 opening through the upper surface thereof and communicating, respectively, with the pipe 139, an exhaust pipe 145 and the pipe 138, the port 143 being located centrally of the disk and the ports 142 and 144 lying within an arc struck from the center of the port 143. The valve device further comprises a rotatable disk portion 146 shown as set into a circular recess 147 formed in the top of the disk 141 and covered by a cap member 148 secured to the disk 141 by the bolts 149 and held in the desired relation to the disk 141 by a pivoting member 150 on the cap 148. The under side of the disk 146 contains a semi-circular groove 151, so positioned that in the oscillations of the disk 146, by the mechanism hereinafter described, the ports 142 and 144 will be caused, alternately, to be in communication with a port 152 in the disk 141 and in communication through a pipe 153 with any suitable source of fluid pressure supply, as for example compressed air. The under side of the disk 146 also contains a groove 154 adapted, in the oscillations of the disk 146 to alternately connect the ports 142 and 144 with the exhaust port 143, the arrangement being such that when the port 142 is in communication with the pipe 153, the port 144 is in communication with the exhaust, and vice versa.

The mechanism shown for operating the valve disk 146, comprises a radially-extending arm 155 pivotally connected with a link 166 which in turn is pivotally connected, at 167, with a stem 168 of a solenoid core 169 reciprocable in a solenoid 170, the winding of which, represented at 171, is connected at opposite ends with the contacts 102 and 103 by the wires 172 and 173, there being any suitable source of electrical energy interposed in either of the wires, such as for example the battery represented at 174 in the wire 173. The stem 168 is surrounded by a coil spring 175 confined between the adjacent end wall 176 of the solenoid 170 and a stop 177 on this rod, this spring operating to yieldingly force the core 169 and its rod 168 to the right in Fig. 13 for causing the valve disk 146 to normally occupy the position shown in Fig. 10 and return it to such position when the solenoid 171 becomes de-energized, it being understood from the foregoing that when a passenger steps upon the treadle 98 the circuit through the solenoid 171 is closed at the contacts 102 and 103 thereby drawing the core 169 into the solenoid and rotating the disk 146 out of the position shown in the drawings, for a purpose hereinafter described. The solenoid structure referred to is preferably provided with a dash-pot feature and to this end the part 176 contains a port 178 opening to the atmosphere and into the cylinder between the end 176 and the adjacent end of the core 169, with an inwardly-opening ball-check 179, the part 176 also containing a port 180. As the core 169 moves inwardly air freely enters the cylinder through the ports 178 and 180, but in the outward movement of the core 169, the ball-check 179 closes the passage 178 and slow venting of the cylinder of its contained air takes place through the port 180, thereby retarding the outward movement of the solenoid core 169.

The operation of the gate-controlling mechanism of Figs. 8 to 13 is as follows, the parts of the mechanism as illustrated in Figs. 8, 9 and 10 being shown in the position they assume after the door 39 has been opened and the passenger has stepped off of the treadle 98. The treading upon the plate treadle 98 by a passenger in walking through the exit-way 36 before alighting from the car causes the contacts 102 and 103 to engage and thereby close the circuit through the solenoid coil 171 with the result of drawing the core 169 inwardly against the resistance of the spring 175 and rotating the disk 146 in counter-clockwise direction in Figs. 10 and 13, to a position in which the groove 151 opens communication between the pipes 142 and 152, and the passageway 154 opens communication between the pipe 139 and the exhaust pipe 145. The piston device 110—111, in this position of the parts, is at the extreme left hand end of the motor, viewing it as viewed in Fig. 9, in which position the crank 118 extends laterally to the right of its shaft 117 in Fig. 9, and the door 39 is closed. The operation of the valve disk 146 as stated, thereby permits air to pass from the pipe 153, through the valve device to the pipe 138, thence through the passage 137 at the left hand side of Fig. 9, and the passages 134 and 136 into the left hand end of the cylinder portion 112, with the result of forcing the piston device 110—111 to the right in Fig. 9 to the position therein shown in which operation the shaft 117 is turned in counterclockwise direction in this figure, thereby moving the crank 118 to the full line position represented in Fig. 8 and the dotted position represented in Fig. 9, the door sections 39 in this operation swinging to open condition as shown in Fig. 8, thereby permitting the passenger to alight from the car. In the movement of the piston 110—111 to the right in Fig. 9 as stated, the air between the piston 111 and the end wall of the cylinder portion 113 exhausts, during the first portion of the movement of the piston, through the passages 129 and 135 at the right hand of Fig. 9 and thence through the pipe 139 and valve to the exhaust pipe 145. The continued movement of the piston 111 passing the point at which the passage 129 communicates with the cylinder 113 and the continued movement of the piston to a position of rest, is, by reason of the exhausting of the air through the relatively small outlet at the passage 135, greatly retarded to cause the door in its final opening movement to move slower than at the beginning of the opening movement, the motor 108 as shown, being such as is commonly employed for opening and closing doors in street car construction and operating the same way. The coil 171 remains energized as long as a passenger or a series of passengers walking fairly closely together, maintain the treadle 98 in depressed condition, but as soon as the passengers discontinue walking on the treadle 98, it rises, breaking the circuit through the coil 171 and permitting the core 169, under the action of the spring 175 to move outwardly, thereby moving the valve disk 146 in clockwise direction in Fig. 10 to the position shown in this figure and in Figs. 11, 12 and 13, the movement of the valve disk 146 to the position just stated operating to cause fluid pressure to flow from the pipe 153, through the valve device, and pipe 139 into the right hand end of the cylinder 113 in Fig. 9 with the result of forcing the piston device 110—111 to the left in Fig.

9 from the position therein shown, toward the left hand end of the cylinder construction, the shaft 117 being thereby rotated in clockwise direction in this figure for moving the door 39 to closed position, the air in the left hand end of the cylinder 112 exhausting therefrom through the valve device of Fig. 10, and producing a retardation of the movement of the piston device 110—111 in its final movement to the left in Fig. 9, as explained of the motor in the operating of the same to a position for opening the door 39.

It will be understood from the foregoing description that, in the construction illustrated in Figs. 1 to 7, by the engagement of the arm 73 with the notched portion of the lever 75, and in the other construction, by the resistance afforded to movement of the doors by the door-operating mechanism, the barrier means provided cannot be moved to open position without stepping on the treadle in the exit-way which is not accessible by persons who might seek to board the car through the exit-way, and therefore access to the car cannot be obtained by any one seeking to enter it through the exit-way.

It is desirable that provision be made for delaying the beginning of the movement of the door 39 to closed position after a passenger has walked beyond the treadle, to avoid closing of the door against the passenger in leaving the exit-way, this being provided for by the dash-pot portion of the solenoid construction which retards the movement of the valve device of Fig. 10, to the position therein shown, under the action of the spring 175. This feature presents the further advantage of avoiding the flapping of the doors by the door-operating mechanism, in the passage through the exit-way of a number of passengers closely following each other, the repeated operations of the treadle under these conditions merely causing the solenoid core and the parts movable therewith to move back and forth, but short of their movement to a position in which the disk of the valve of Fig. 10 occupies the position therein shown.

It will be readily understood from the foregoing that my invention may be embodied in other forms than those shown, it being my intention not to limit my invention to the arrangement of parts shown and described.

What I claim as new, and desire to secure by Letters Patent, is:

1. A vehicle having entrance and exit ways and oscillatory barrier means for preventing persons boarding the vehicle through said exit-way operable for opening by the mere act of passengers going through the exit-way.

2. A vehicle having entrance and exit ways and oscillatory barrier means for preventing persons boarding the vehicle through said exit-way movable by the mere act of a passenger going through the exit-way.

3. A vehicle having entrance and exit ways, oscillatory barrier means for preventing persons boarding the vehicle through said exit-way, and mechanism operated by the mere act of a passenger leaving the vehicle through said exit-way, operating to move said barrier means out of barrier-forming position.

4. A vehicle having entrance and exit ways, oscillatory barrier means for preventing persons boarding the vehicle through said exit-way, and mechanism operated by the mere act of passenger leaving the vehicle through said exit-way, operating to move said barrier means out of barrier-forming position and automatically return the latter to barrier-forming position.

5. A vehicle having entrance and exit ways, oscillatory barrier means for said exit-way for preventing persons boarding the vehicle through said exit-way operable for opening by the mere act of passengers going through the exit-way, and including means releasably locking said barrier against movement to open position.

6. A vehicle having entrance and exit ways, an oscillatory barrier for said exit-way, means releasably locking said barrier against said movement to open position and movable, by the mere act of a passenger in moving through said exit-way, to a position for releasing said barrier for movement out of barrier-forming position.

7. A vehicle having entrance and exit ways, oscillatory barrier means for said exit-way for preventing persons boarding the vehicle through said exit-way operable for opening by the mere act of passengers going through the exit-way, and including means releasably locking said barrier against movement to open position and movable by the mere act of a passenger walking through the exit-way to alight from the vehicle, to a position for releasing said barrier for movement out of barrier-forming position.

8. A vehicle having entrance and exit ways and oscillatory barrier means for preventing persons boarding the vehicle through said exit-way operable for opening by the mere act of passengers going through the exit-way, and automatically returnable to barrier-forming position.

9. A vehicle having entrance and exit ways and oscillatory barrier means for preventing persons boarding the vehicle through said exit-way movable by the mere act of a passenger going through the exit-way and automatically returnable to barrier-forming position.

10. A vehicle having entrance and exit ways, oscillatory barrier means for preventing persons boarding the vehicle through said exit-way operable for opening by the mere act of passengers going through the exit-way, means releasably locking said barrier means against movement to open position, and means operating automatically to return said barrier means to barrier-forming position.

11. A vehicle having entrance and exit ways, an oscillatory barrier for said exit-way, means releasably locking said barrier against movement to open position and movable, by the mere act of a passenger going through the exit-way, to a position for releasing said barrier for movement to open position, and means operating automatically to return said barrier to barrier-forming position.

12. A vehicle having entrance and exit ways, an oscillatory barrier for said exit-way, means releasably locking said barrier against movement to open position and movable, by the mere act of a passenger walking through the exit-way to alight from the vehicle, to a position for releasing said barrier for movement out of barrier-forming position, and means operating automatically to return said barrier to barrier-forming position.

13. A vehicle having entrance and exit ways, a barrier at the outer end of said exit-way, means controllable by the operator of the car for moving said barrier, and a second barrier in said exit-way constructed and arranged to extend, when out of barrier-forming position, beyond the plane occupied by said first-referred-to barrier when the latter is in closed condition, operable for opening by passengers going through the exit-way.

14. A vehicle having entrance and exit ways, oscillatory barrier means at said exit-way for preventing persons boarding the vehicle through said exit-way a movable member positioned to be moved by the mere act of passengers passing through said exit-way, and means controllable by the position of said member for controlling said barrier means.

15. A vehicle having entrance and exit ways, a movable member positioned to be moved by the mere act of passengers passing through said exit-way, and oscillatory barrier means for preventing persons boarding the vehicle through said exit-way controlled by the position of said member.

16. A vehicle having entrance and exit ways, an oscillatory barrier for said exit-way, and means releasably locking said barrier against movement out of barrier-forming position, including a member movable to a position for unlocking said barrier by the mere act of a passenger going through said exit-way.

17. A vehicle having entrance and exit ways, barrier means for preventing persons boarding the vehicle through said exit-way, and mechanism including an actuating member which is moved by a passenger in the movement of the passenger through the exit-way, operating to move said barrier-means out of barrier-forming position.

18. A vehicle having entrance and exit ways, barrier means for preventing persons boarding the vehicle through said exit-way, and mechanism including an actuating member which is moved by a passenger in the movement of the passenger through the exit-way, operating to move said barrier-means out of barrier-forming position and automatically return the latter to barrier-forming position.

19. A vehicle having entrance and exit ways, oscillatory barrier means for preventing persons boarding the vehicle through said exit-way movable by a passenger going through the exit-way, releasable locking means for said barrier means, and a depressable member positioned to be walked upon by the passenger in moving through the exit-way, for effecting the release of said locking means.

20. A vehicle having entrance and exit ways, barrier means for preventing persons boarding the vehicle through said exit-way, mechanism for moving said barrier means out of barrier-forming position, and a depressable member positioned to be walked upon a passenger in moving through said exit-way, for controlling the operation of said mechanism.

21. A vehicle having entrance and exit ways, barrier means for preventing persons boarding the vehicle through said exit-way, mechanism for moving said barrier means out of barrier-forming position and automatically returning the latter to barrier-forming position, and a depressable member positioned to be walked upon a passenger in moving through said exit-way, for controlling the operation of said mechanism.

22. A vehicle having entrance and exit ways, barrier means for preventing persons boarding the vehicle through said exit-way, a fluid-pressure-operated device operating to move said barrier means out of barrier-forming position, and mechanism operated by a passenger leaving the vehicle through said exit-way, for controlling the operation of said device.

23. A vehicle having entrance and exit ways, barrier means for preventing persons boarding the vehicle through said exit-way, a fluid-pressure-operated device operating to move said barrier means out of barrier-forming position, and automatically return the latter to barrier-forming position, and mechanism operated by the passenger leaving the vehicle through said exit-way, for controlling the operation of said device.

24. A vehicle having entrance and exit ways, barrier means for preventing persons boarding the vehicle through said exit-way, and electrically-controlled mechanism operated by a passenger leaving the vehicle through said exit-way, operating to move said barrier means out of barrier-forming position.

25. A vehicle having entrance and exit ways, barrier means for preventing persons boarding the vehicle through said exit-way, and electrically controlled mechanism operated by a passenger leaving the vehicle through said exit-way, operating to move said barrier means out of barrier-forming position, said barrier means returning automatically to barrier-forming position.

26. A vehicle having entrance and exit ways, barrier means for preventing persons boarding the vehicle through said exit-way, and electrically-controlled mechanism operated by a passenger leaving the vehicle through said exit-way, operating to move said barrier means out of barrier-forming position and automatically return the latter to barrier-forming position.

27. A vehicle having entrance and exit ways, barrier means for preventing persons boarding the vehicle through said exit-way, and an electrically-controlled fluid-pressure-operated device operated by a passenger leaving the vehicle through said exit-way and operating to move said barrier means out of barrier-forming position.

28. A vehicle having entrance and exit ways, barrier means for preventing persons boarding the vehicle through said exit-way, and an electrically-controlled fluid-pressure-operated device operated by a passenger leaving the vehicle through said exit-way and operating to move said barrier means out of barrier-forming position, said barrier means automatically returning to barrier-forming position.

29. A vehicle having entrance and exit ways, barrier means for preventing persons boarding the vehicle through said exit-way, means operated automatically to move said barrier means out of barrier-forming position, and means having a delayed movement for returning said barrier means to barrier-forming position.

30. A vehicle having entrance and exit ways, barrier means for preventing persons boarding the vehicle through said exit-way, means operated automatically by a passenger walking through said exit-way, for moving said barrier means out of barrier-forming position, and means having a delayed movement, operating automatically to return said barrier means to barrier-forming position.

31. A vehicle having entrance and exit ways, barrier means for preventing persons boarding the vehicle through said exit-way, a fluid-pressure-operated device for moving said barrier means into and out of barrier-forming position and including a valve device, electrically controlled means for controlling the movement of said valve device, and means operated by passengers passing through said exit-way, for controlling said electrically-controlled means.

32. A vehicle having entrance and exit ways, oscillatory barrier means for preventing persons boarding the vehicle through said exit way, and mechanism, including means controlled by an "exiting passenger" for moving the barrier means out of barrier-forming position.

33. A vehicle having entrance and exit ways, oscillatory barrier means for preventing persons boarding the vehicle through said exit way, and mechanism including means controlled by the mere act of a passenger in passing through said exit way, for moving the barrier means out of barrier-forming position.

34. A vehicle having entrance and exit ways, barrier means for preventing persons boarding the vehicle through said exit way, and mechanism, including means controlled by an "exiting passenger" for moving the barrier means out of barrier-forming position.

35. A vehicle having entrance and exit ways, barrier means for preventing persons boarding the vehicle through said exit way, and mechanism including means controlled by the mere act of a passenger in passing through said exit way, for moving the barrier means out of barrier-forming position.

HARRY H. ADAMS.